United States Patent
Chang et al.

(10) Patent No.: US 12,433,935 B2
(45) Date of Patent: Oct. 7, 2025

(54) PRODUCING METHOD OF MESENCHYMAL STEM CELL FOR PREVENTION OR TREATMENT OF BRAIN NEURONAL DISEASE INCLUDING GHRELIN TREATMENT AND USE THEREOF

(71) Applicant: Samsung Life Public Welfare Foundation, Seoul (KR)

(72) Inventors: Jong Wook Chang, Seoul (KR); Hyeong Seop Kim, Incheon (KR)

(73) Assignee: Samsung Life Public Welfare Foundation, Seoul (KR)

( * ) Notice: Subject to any disclaimer, the term of this patent is extended or adjusted under 35 U.S.C. 154(b) by 564 days.

(21) Appl. No.: 17/295,385

(22) PCT Filed: Feb. 9, 2021

(86) PCT No.: PCT/KR2021/001737
§ 371 (c)(1),
(2) Date: May 19, 2021

(87) PCT Pub. No.: WO2021/162426
PCT Pub. Date: Aug. 19, 2021

(65) Prior Publication Data
US 2022/0339258 A1    Oct. 27, 2022

(30) Foreign Application Priority Data
Feb. 13, 2020   (KR) .................. 10-2020-0017782

(51) Int. Cl.
*A61K 38/22*     (2006.01)
*A61K 35/28*     (2015.01)
*A61P 25/28*     (2006.01)
*C12N 5/0775*    (2010.01)

(52) U.S. Cl.
CPC .............. *A61K 38/22* (2013.01); *A61K 35/28* (2013.01); *A61P 25/28* (2018.01); *C12N 5/0665* (2013.01); *C12N 2501/30* (2013.01)

(58) Field of Classification Search
CPC ......... A61K 38/22; A61K 35/28; A61P 25/28; C12N 5/0665; C12N 2501/30
USPC ...................................................... 424/93.21
See application file for complete search history.

(56) References Cited

FOREIGN PATENT DOCUMENTS

WO   WO 2018/052182   *   3/2018

OTHER PUBLICATIONS

Ye et al., Ghrelin accelerates the growth and osteogenic differentiation of rabbit mesenchymal stem cells through the ERK1/2 pathway, BMC Biotechnology, vol. 15, (2015), pp. 1-10.*
Lee et al., "Agouti Related Peptide Secreted Via Human Mesenchymal Stem Cells Upregulates Proteasome Activity in an Alzheimer's Disease Model", Scientific Reports | 7:39340 | DOI: 10.1038/srep39340.
Agouti-related peptide, Wikipedia.
Ye et al., "Ghrelin accelerates the growth and osteogenic differentiation of rabbit mesenchymal stem cells through the ERK1 /2 pathway", BMC Biotechnology (2015) 15:51 D0110.1186/s12896-015-0176-2.
Han et al., "Ghrelin Improves Functional Survival of Engrafted Adipose-Derived Mesenchymal Stem Cells in Ischemic Heart through PI3K/Akt Signaling Pathway", BioMed Research International vol. 2015, Article ID 858349, 12 pages, http://dx.doi.org/10.1155/2015/858349.
Liu et al., "Ghrelin promotes neural differentiation of adipose tissuederived mesenchymal stem cell via AKT/mTOR and β-catenin signaling pathways", Wiley, Kaohsiung J Med Sci 2020; 36:405-416.
Jeon et al., "Ghrelin in Alzheimer's disease: Pathologic roles and Therapeutic implications", Ageing Research Reviews 55 (2019) 100945; https://doi.org/10.1016/j.arr.2019.100945.
Rana K. El-Asfar et al., "Obestatin can potentially differentiate Wharton's jelly mesenchymal stem cells into insulin-producing cells", Cell Tissue Res., 372, 91-98 (Nov. 20, 2017).

* cited by examiner

*Primary Examiner* — Jennifer M. H. Tichy
(74) *Attorney, Agent, or Firm* — Wood, Phillips, Katz, Clark & Mortimer (57) ABSTRACT

Disclosed is a producing method of a mesenchymal stem cell for brain neuronal disease prevention or treatment including ghrelin treatment, a composition for producing a mesenchymal stem cell for brain neuronal disease prevention or treatment, a mesenchymal stem cell produced by the producing method, and a pharmaceutical composition for prevention or treatment of brain neuronal disease containing the same. When using the producing method of the mesenchymal stem cells with the increased AgRP (Agouti related peptide) expression level according to the present disclosure, the mesenchymal stem cells produced by the method, or ghrelin, various brain neuronal diseases such as Alzheimer's disease may be effectively prevented or treated. When the composition for producing the mesenchymal stem cells with the increased AgRP expression level containing ghrelin according to the present disclosure is used, the mesenchymal stem cells with the increased AgRP expression level may be effectively produced.

2 Claims, 11 Drawing Sheets
Specification includes a Sequence Listing.

SEQUENCE LISTING

<160> NUMBER OF SEQ ID NOS: 6

<210> SEQ ID NO 1
<211> LENGTH: 20
<212> TYPE: DNA
<213> ORGANISM: Artificial
<220> FEATURE:
<223> OTHER INFORMATION: AgRP forward

<400> SEQUENCE: 1
agtcacgtgt ggcccttcat                                             20

<210> SEQ ID NO 2
<211> LENGTH: 20
<212> TYPE: DNA
<213> ORGANISM: Artificial
<220> FEATURE:
<223> OTHER INFORMATION: AgRP reverse

<400> SEQUENCE: 2
tccgggattc ttgcctagag                                             20

<210> SEQ ID NO 3
<211> LENGTH: 22
<212> TYPE: DNA
<213> ORGANISM: Artificial
<220> FEATURE:
<223> OTHER INFORMATION: mAgRP1 forward

<400> SEQUENCE: 3
aacctctgta gtcgcaccta gc                                          22

<210> SEQ ID NO 4
<211> LENGTH: 22
<212> TYPE: DNA
<213> ORGANISM: Artificial
<220> FEATURE:
<223> OTHER INFORMATION: mAgRP1 reverse

<400> SEQUENCE: 4
aaaccgtccc atcctttatt ct                                          22

<210> SEQ ID NO 5
<211> LENGTH: 23
<212> TYPE: DNA
<213> ORGANISM: Artificial
<220> FEATURE:
<223> OTHER INFORMATION: mAgRP2 forward

<400> SEQUENCE: 5
aagtctgaat ggcctcaaga aga                                         23

<210> SEQ ID NO 6
<211> LENGTH: 21
<212> TYPE: DNA
<213> ORGANISM: Artificial
<220> FEATURE:
<223> OTHER INFORMATION: mAgRP2 reverse

<400> SEQUENCE: 6
gactcgtgca gccttacaca g                                           21

PRODUCING METHOD OF MESENCHYMAL STEM CELL FOR PREVENTION OR TREATMENT OF BRAIN NEURONAL DISEASE INCLUDING GHRELIN TREATMENT AND USE THEREOF

TECHNICAL FIELD

The present disclosure relates to a producing method of a mesenchymal stem cell for brain neuronal disease prevention or treatment including ghrelin treatment, relates to a composition for producing a mesenchymal stem cell for brain neuronal disease prevention or treatment, a mesenchymal stem cell produced by the producing method, and a pharmaceutical composition for prevention or treatment of brain neuronal disease containing the same.

BACKGROUND ART

Degenerative brain disease refers to a disease that occurs in the brain in company with aging. Degenerative brain disease may be classified based on main symptoms and affected brain regions; and may include Alzheimer's disease and Parkinson's disease. It is known that degenerative brain disease is caused by neurodegeneration due to aging and by neuronal cell death due to protein aggregation due to genetic and environmental factors. However, an exact cause of the degenerative brain disease is not identified. Thus, a basic study for the cause is actively being conducted.

In the meantime, Dr. Irwin Rose of the United States and Dr. Aaron Ciechanover and Avram Hershko of Israel won the 2004 Nobel Prize in Chemistry by finding out a process in which an ubiquitin-proteasome system (UPS) selectively degrades a protein to which a molecule called ubiquitin attaches. The ubiquitin proteasome system is involved in biological processes such as removal of abnormal proteins from eukaryotic cells, cell division, and repair of damaged DNA. In diseases such as degenerative brain disease, when abnormalities in the ubiquitin proteasome system occur, toxic proteins accumulate in vivo. In particular, it has been reported that in Alzheimer's disease as a degenerative brain disease, amyloid beta plaque inhibits the activity of the ubiquitin proteasome system, and proteasome activity is reduced in the brain both of Alzheimer's disease animal models.

Therefore, there is a need for research to more effectively produce a substance that increases the proteasome activity of a nerve cell and a substance that increases the proteasome activity.

DISCLOSURE

Technical Purpose

Accordingly, the present inventors have studied a method or a substance for treating brain neuronal diseases. Thus, we have identified that when mesenchymal stem cells are treated with ghrelin, an expression of AgRP (Agouti related peptide) as a protein that regulates the proteasome activity increases in mesenchymal stem cells. Further, we have identified that even when hypothalamus cells were directly treated with ghrelin, AgRP expression increases in the hypothalamus cells. Thus, we have identified that the mesenchymal stem cells treated with ghrelin, or ghrelin itself may be effectively used for the treatment of brain neuronal disease. Thus, the disclosure has been completed.

Therefore, a purpose of the present disclosure is to provide a producing method of mesenchymal stem cells with an increased AgRP level, the method including a step of treating mesenchymal stem cells with ghrelin, and to provide mesenchymal stem cells produced thereby.

Further, a purpose of the present disclosure is to provide a pharmaceutical composition for the prevention or treatment of brain neuronal disease, the composition comprising the produced mesenchymal stem cell, a conditioned medium thereof or ghrelin.

Further, a purpose of the present disclosure is to provide a composition for producing mesenchymal stem cells with an increased AgRP expression level, the composition comprising ghrelin.

Further, a purpose of the present disclosure is to provide a prevention or treatment method of brain neuronal diseases, the method including a step of administering a mesenchymal stem cell with an increased AgRP expression level or a conditioned medium thereof to a subject in need thereof.

Technical Solution

To achieve the purposes, a method for producing mesenchymal stem cells with an increased AgRP (Agouti related peptide) expression level, the method including a step of treating mesenchymal stem cells with ghrelin is provided.

Further, the present disclosure provides mesenchymal stem cells with an increased AgRP expression level as produced by the producing method.

Further, the present disclosure provides a pharmaceutical composition for prevention or treatment of brain neuronal diseases, the composition comprising mesenchymal stem cells with an increased AgRP expression level or a conditioned medium thereof.

Further, the present disclosure provides a composition for producing mesenchymal stem cells with an increased AgRP expression level, the composition comprising ghrelin.

Further, the present disclosure provides a pharmaceutical composition for prevention or treatment of brain neuronal diseases, the composition comprising ghrelin.

Further, the present disclosure provides a composition for producing mesenchymal stem cells with an increased AgRP expression level, the composition comprising ghrelin.

In addition, the present disclosure provides a prevention or treatment method of brain neuronal diseases, the method including a step of administering mesenchymal stem cells with an increased AgRP expression level or a conditioned medium thereof to a subject in need thereof.

Technical Effects

When using the producing method of the mesenchymal stem cells with the increased AgRP (Agouti related peptide) expression level according to the present disclosure, the mesenchymal stem cells produced by the method, or ghrelin, various brain neuronal diseases such as Alzheimer's disease may be effectively prevented or treated. When the composition for producing the mesenchymal stem cells with the increased AgRP expression level containing ghrelin according to the present disclosure is used, the mesenchymal stem cells with the increased AgRP expression level may be effectively produced.

DETAILED DESCRIPTIONS

The present disclosure provides a method for producing mesenchymal stem cells with the increased AgRP (Agouti related peptide) expression level, the method including the step of treating mesenchymal stem cells with ghrelin.

Further, the present disclosure provides mesenchymal stem cells with the increased AgRP expression level produced by the producing method.

In the present disclosure, the AgRP (Agouti related peptide) may mean a neuropeptide produced in the brain by AgRP/NPY neurons. The AgRP may include AgRP derived from a vertebrate including human, for example, mammals, fish, amphibians, birds, or reptiles. Further, the AgRP may include a precursor of AgRP.

The AgRP according to the present disclosure may promote proteasome activity and promote the decomposition of toxic polymers deposited in the brain and may be helpful in the treatment of brain neuronal disease based on the mechanism of promoting the decomposition of the toxic polymer.

In the present disclosure, the mesenchymal stem cells (MSCs) may mean a cell that may maintain self-renewal and sternness maintenance and differentiate into various mesenchymal tissues, and may include mesenchymal stem cells of animals including mammals, for example humans. Further, the mesenchymal stem cell may be an umbilical cord, bone marrow, placenta, adipose tissue, umbilical cord blood, Wharton's jelly, or tonsil-derived mesenchymal stem cell. The umbilical cord may mean a string that connects the mother and the belly to each other so that the mammalian fetus may grow in the placenta. In general, the umbilical cord may mean a tissue composed of three blood vessels surrounded with Wharton's Jelly, that is, two umbilical arteries and one umbilical vein. Therefore, in the present disclosure, the mesenchymal stem cell may be a mesenchymal stem cell derived from an umbilical cord. Isolation of mesenchymal stem cells may be performed by methods that are obvious to those of ordinary skill in the art. The mesenchymal stem cell may express AgRP (Agouti-related peptide) or an active fragment thereof. Preferably, compared to mesenchymal stem cells not treated with ghrelin, the expression of AgRP may be increased in the ghrelin-treated mesenchymal stem cells.

In the present disclosure, the ghrelin is a hormone that increases appetite. The ghrelin receptor may be expressed in the hypothalamic neuron that expresses leptin receptors. The mesenchymal stem cells may be treated with the ghrelin to increase AgRP expression in the mesenchymal stem cells. Preferably, when the mesenchymal stem cells are treated with ghrelin at a concentration of 10 pM to 1 M, AgRP secretion in the mesenchymal stem cells may be increased. More preferably, when the mesenchymal stem cell is treated with ghrelin at a concentration of 1 nM to 100 nM, AgRP secretion in the mesenchymal stem cell may be remarkably increased.

In the present disclosure, the mesenchymal stem cell with the increased AgRP expression level may be effectively used for the prevention or treatment of brain neuronal disease, based on the increased AgRP.

Further, the present disclosure provides a pharmaceutical composition for prevention or treatment of brain neuronal disease, the composition comprising mesenchymal stem cells with the increased AgRP expression level or a conditioned medium thereof.

In the present disclosure, the pharmaceutical composition may further contain ghrelin.

Further, the present disclosure provides a pharmaceutical composition for prevention or treatment of brain neuronal disease, the composition comprising ghrelin. In the present disclosure, the conditioned medium may be obtained by culturing the mesenchymal stem cells with an increased AgRP expression level, and thus may contain AgRP at a high concentration.

In the present disclosure, the brain neuronal disease may be any one or more selected from the group consisting of Alzheimer's disease, Frontotemporal dementia, tauopathy, Parkinson's disease, Lou Gehrig disease, Huntington's disease, Multiple sclerosis, stroke, thrombosis, embolism, head trauma, cerebral circulation metabolic disorder, brain dysfunction, and dementia. Preferably, the brain neuronal disease may be Alzheimer's disease.

The composition according to the present disclosure may contain the active ingredient in an arbitrary amount (effective amount) depending on the use, formulation, and purpose of combination as long as the amount may exhibit the prevention or treatment effect of brain neuronal disease. A typical effective amount will be determined within the range of 0.001% to 99.990% by weight based on the total weight of the composition. The "effective amount" refers to the amount of an active ingredient capable of inducing the prevention or treatment effect of brain neuronal disease. Such effective amounts may be determined empirically within the ordinary skill of a person skilled in the art. Preferably, the subject to which the composition according to the present disclosure may be applied (prescribed) in mammals and humans, in particular, humans.

In the present disclosure, the 'stem cell conditioned medium' is a substance containing constituents contained in a medium obtained by culturing stem cells. The type of mesenchymal stem cells for producing the conditioned medium is not limited particularly. The mesenchymal stem cells for producing the conditioned medium may be an umbilical cord, bone marrow, placenta, adipose tissue, umbilical cord blood, Wharton's jelly or tonsil-derived stem cell. Preferably, the mesenchymal stem cells for producing the conditioned medium may be a mesenchymal stem cell derived from Wharton's jelly.

In the present disclosure, the term 'prevention' may mean any action that suppresses or delays the onset of brain neuronal disease by administering the composition according to the present disclosure to a subject.

In the present disclosure, the term 'treatment' may mean any action that allows the symptoms of brain neuronal disease to be reduced or benefit by administering the composition according to the present disclosure to a subject suspected of developing brain neuronal disease.

In the present disclosure, the ghrelin may stimulate the pituitary gland to promote the secretion of AgRP from the pituitary gland, and may be effective in preventing or treating the brain neuronal disease based on the mechanism of promoting the AgRP secretion. That is, the present disclosure provides the use of ghrelin for producing mesenchymal stem cells with the increased AgRP expression level; and for brain neuronal disease prevention or treatment.

The pharmaceutical composition for prevention or treatment of the brain neuronal disease may contain the mesenchymal stem cell, a conditioned medium thereof or ghrelin alone as an active ingredient. In addition, additional ingredients, that is, a pharmaceutically acceptable or nutritionally acceptable carrier, excipient, diluent, or auxiliary ingredient may be additionally contained in the composition depending on the formulation, method of use, and purpose of use.

Further, the carrier, excipient or diluent may be one or more selected from the group consisting of lactose, dextrose, sucrose, sorbitol, mannitol, xylitol, erythritol, maltitol, starch, gum acacia, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate and mineral oil, dextrin, calcium carbonate, propylene glycol, liquid paraffin, and physiological saline. The present disclosure is not limited thereto, and all conventional carriers, excipients, or diluents may be used. The ingredients may be added independently or in combination with the pharmaceutical composition as the active ingredient.

Further, when the pharmaceutical composition for prevention or treatment of the brain neuronal disease is formulated, the formulation further contains conventional fillers, extenders, binders, disintegrants, surfactants, anti-aggregating agents, lubricants, wetting agents, fragrances, emulsifiers or preservatives, etc. For example, the formulation may be used orally or parenterally.

The dosage of the pharmaceutical composition for prevention or treatment of brain neuronal disease according to the present disclosure may be appropriately selected by a person skilled in the art in consideration of the administration method, the age, sex and weight of the user, and the severity of the disease. For example, the pharmaceutical composition for prevention or treatment of brain neuronal disease according to the present disclosure may be administered in 0.0001 mg/kg to 1000 mg/kg, and 0.01 mg/kg to 100 mg/kg for more effective treatment, based on the pharmaceutical composition. The composition may be administered once a day, or several times a day in a divided manner. The dosage does not in any way limit the scope of the present disclosure.

Further, the pharmaceutical composition for prevention or treatment of brain neuronal disease according to the present disclosure may further contain a compound or plant extract as known to have a brain neuronal disease prevention or treatment effect, in addition to the mesenchymal stem cell with an increased AgRP expression level, a conditioned medium thereof or ghrelin. The compound or plant extract may be contained in 5 parts by weight to 20 parts by weight, based on 100 parts by weight of the composition. In particular, the mesenchymal stem cell with the increased AgRP expression level, the conditioned medium thereof, and ghrelin may be used in combination with each other.

In the present disclosure, the pharmaceutical composition for prevention or treatment of the brain neuronal disease may be effectively used for the prevention or treatment of brain neuronal disease via AgRP.

In one example, a mesenchymal stem cell with an increased AgRP expression level in accordance with the present disclosure or a conditioned medium thereof may be administered simultaneously with ghrelin. Alternatively, a mesenchymal stem cell with an increased AgRP expression level in accordance with the present disclosure or a conditioned medium thereof and ghrelin may be administered sequentially with a time difference. In the sequential administration with a time difference, the mesenchymal stem cell with an increased AgRP expression level in accordance with the present disclosure or a conditioned medium thereof and ghrelin may be contained in a separate container or a container divided into compartments.

Further, the present disclosure provides a prevention or treatment method for brain neuronal disease, the method including a step of administering a mesenchymal stem cell with an increased AgRP expression level or a conditioned medium thereof to a subject in need thereof.

In the prevention or treatment method of the brain neuronal disease according to the present disclosure including administering a mesenchymal stem cell with an increased AgRP expression level or a conditioned medium thereof to a subject in need thereof, the mesenchymal stem cell with an increased AgRP expression level or the conditioned medium thereof may be administered into the subject in various forms. For example, a mesenchymal stem cell with an increased AgRP expression level or a conditioned medium thereof may be administered into the subject in the form of the pharmaceutical composition. However, the disclosure is not limited thereto.

The prevention or treatment method of the brain neuronal disease according to the present disclosure may further include administering ghrelin to the subject. The administering of ghrelin to the subject and 'the administering of the mesenchymal stem cell with an increased AgRP expression level or the conditioned medium thereof to the subject in need thereof may be conducted concurrently or non-concurrently.

The 'subject' may be a subject who suffers from the brain neuronal disease, but is not limited thereto.

Further, the disclosure provides a composition for producing mesenchymal stem cells with the increased AgRP expression level, the composition comprising ghrelin.

In the present disclosure, the composition may contain a medium for stem cell culture, an antioxidant, or other substances commonly used for stem cell production without limitation.

In the present disclosure, the medium for culturing the stem cells may additionally contain mesenchymal stem cell growth factors that affect the growth of mesenchymal stem cells. The growth factors of mesenchymal stem cells may include insulin, hydrocortisone, EGF (Epidermal Growth Factor), LIF (Leukemia Inhibitory Factor), GM-CSF (Granulocyte-macrophage colony stimulating factor), EPO (Erythropoietin), a fibroblast growth factor (FGF), an insulin-like growth factor (IGF), a platelet-derived growth factor (PDGF), a stem cell factor (SCF), or a transforming growth factor (TGF), but may not be limited thereto.

In the present disclosure, treating the mesenchymal stem cells with ghrelin may effectively produce mesenchymal stem cells with the increased AgRP expression levels that may be used for prevention or treatment of brain neuronal diseases. Preferably, when the mesenchymal stem cells are treated with ghrelin at a concentration of 10 pM to 1 M, mesenchymal stem cells with the increased AgRP secretion may be produced. More preferably, when the mesenchymal stem cells are treated with ghrelin at a concentration of 1 nM to 100 nM, mesenchymal stem cells with remarkably increased AgRP secretion may be produced.

Duplicate content is omitted in consideration of the complexity of the present disclosure. Terms not otherwise defined in the present disclosure have meanings commonly used in the technical field to which the present disclosure belongs.

EXAMPLES

Hereinafter, the present disclosure will be described in detail based on Examples. However, the following Example is only to illustrate the present disclosure, and the present disclosure is not limited to the following Example.

Example 1. Identification of Promotion of Ghrelin Secretion in Mesenchymal Stem Cells Via Exposure to the Alzheimer's Disease Environment 1.1 Producing Neurons Differentiated from Induced Pluripotent Stem Cells (iPSCs) Derived from Alzheimer's Patients We isolated peripheral blood mononuclear cells (PBMC) from blood collected from Alzheimer's patients and reprogrammed the isolated peripheral blood mononuclear cell into an induced pluripotent stem cell (iPSC) according to a known method (iPSC Modeling of Presenilin1 Mutation in Alzheimer's Disease with Cerebellar Ataxia, Ling Li et al., 2018, Exp Neurobiol). Then, the induced pluripotent stem cell was differentiated into neurons for 9 weeks to produce Alzheimer's disease cell model neurons.

1.2 Identification of Ghrelin Secretion Promotion Via Co-Culture of Mesenchymal Stem Cells and Neurons Differentiated from Induced Pluripotent Stem Cells Derived from Alzheimer's Patients The neurons produced in Example 1.1 were cultured in a lower chamber of a 6-well transwell system. After thawing and stabilizing the WJ-MSC (Wharton's Jelly-mesenchymal stem cell) stock produced at the GMP facility of Samsung Medical Center, the WJ-MSC was seeded, at $1 \times 10^5$, on an upper chamber of the 6-well transwell system. One day after the WJ-MSC seeding, the upper chamber was moved to a 6-well plate system containing the neurons produced in Example 1.1. For 1 week, the WJ-MSC and the neurons were co-cultured in Neurobasal A medium (Gibco, 10888022) containing penicillin-streptomycin (Gibco, 15140122) and B27 supplement minus vitamin A (Gibco, 12587010). After the co-culturing, WJ-MSC was treated with Trizol (Gibco, 15596026), and then mRNA was extracted according to the manufacturer's manual. QuantSeq 3' mRNA-seq (QuantSeq 3' mRNA-Seq Library Prep Kit FWD for Illumina) was performed using the extracted mRNA. Genes with increased expression were selected in the co-cultured WJ-MSC, compared to the non-co-cultured mesenchymal stem cell (naive MSC). The results are shown in FIG. 1.

Figure 1:
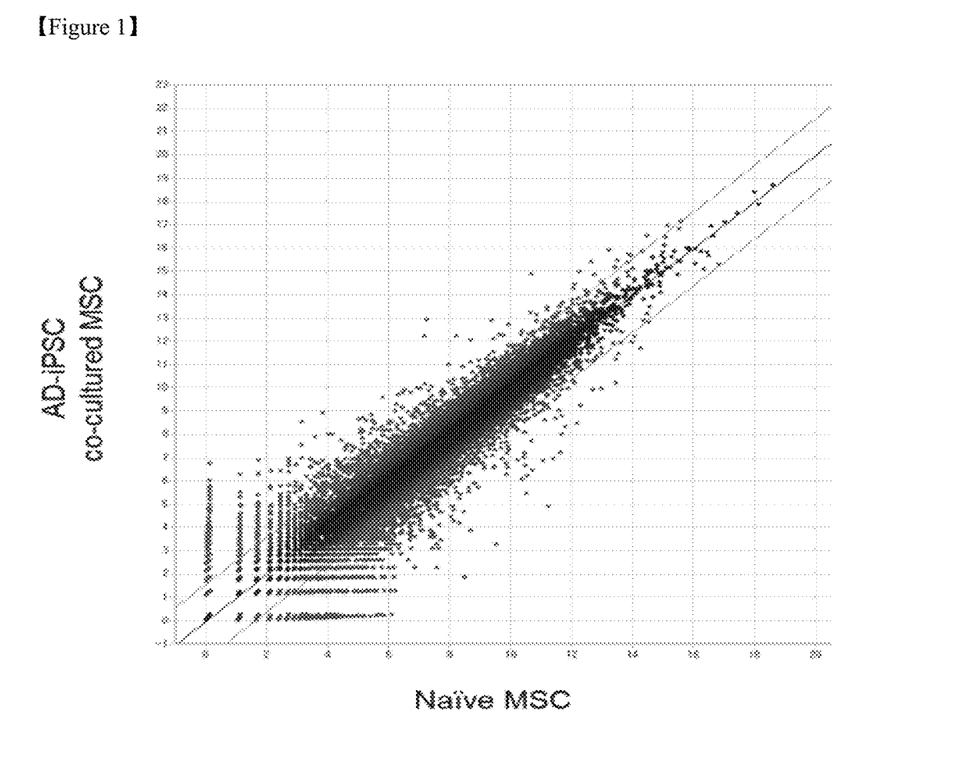
FIG. 1 is a diagram showing the increase in ghrelin expression when neurons differentiated from mesenchymal stem cells (WJ-MSC) and induced pluripotent stem cells derived from Alzheimer's patients were co-cultured. (Red dot: A protein whose secretion amount is increased via co-culture among proteins secreted from WJ-MSC; Green dot: A protein whose secretion amount is decreased via co-culture among proteins secreted from WJ-MSC)

As shown in FIG. 1, it is identified that the genes having the increased expression in the co-cultured WJ-MSC include ghrelin. Based on these results, it was identified that ghrelin secretion was promoted when the mesenchymal stem cells were exposed to the Alzheimer's disease environment.

Figure 2A:
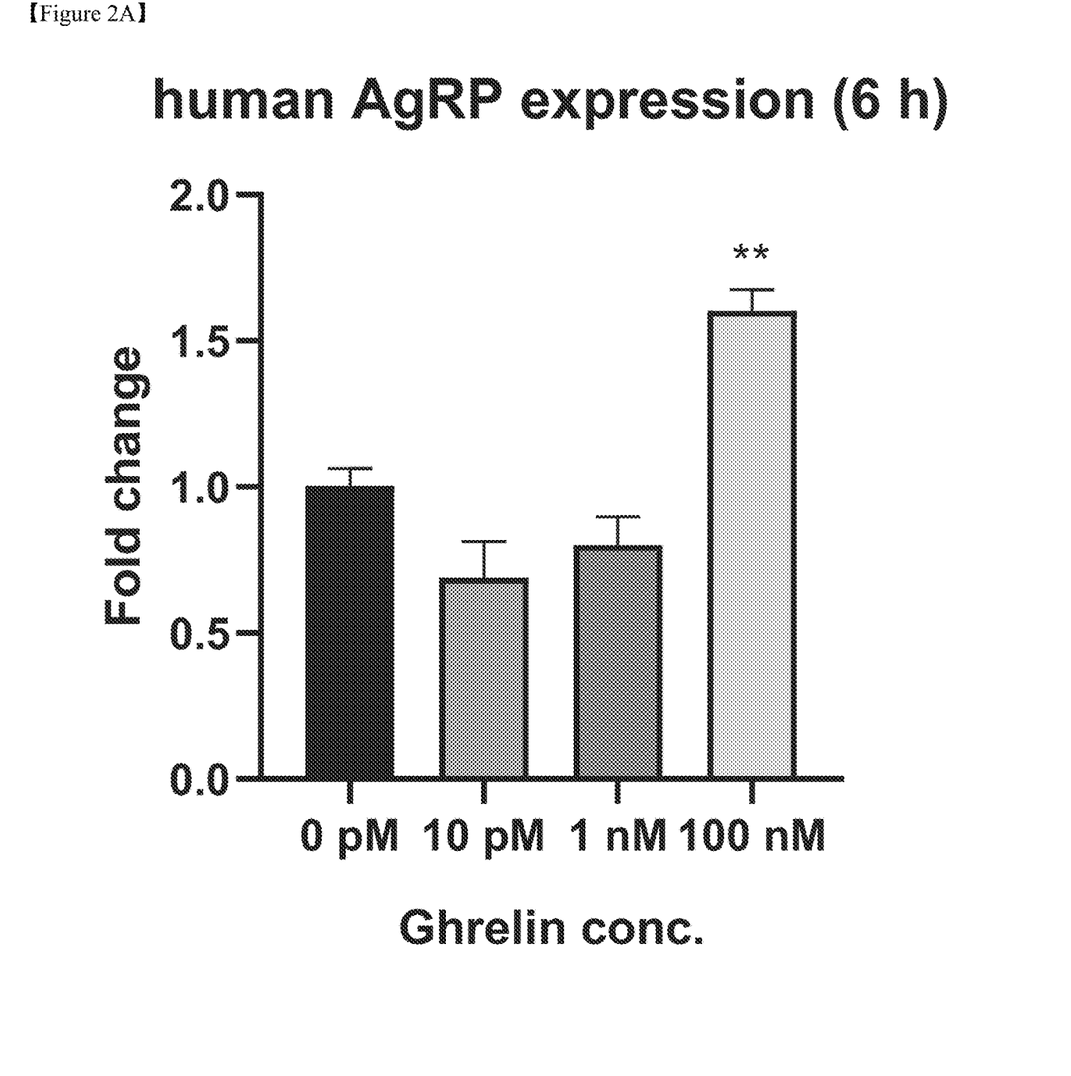
FIG. 2A shows the increase in AgRP gene expression in mesenchymal stem cells (WJ-MSC) treated with human recombinant ghrelin for 6 hours (**$P<0.01$).

Example 2. AgRP Expression Level Increase in Mesenchymal Stem Cells Via Ghrelin Treatment An experiment was conducted to identify the effect on the expression of AgRP (Agouti related peptide) known as a therapeutic agent for brain neuronal disease such as Alzheimer's disease in mesenchymal stem cells when the mesenchymal stem cells were directly treated with ghrelin. WJ-MSCs were thawed in a 175T flask and stabilized for 3 days, and then cultured for 2 days in MEM alpha medium (Gibco, 12571063) to which 10% FBS (Biowest, S1480) and 5 µg/ml gentamicin were added. Thereafter, the WJ-MSCs were seeded, at $0.8 \times 10^6$, on a 6-well plate under 10% FBS conditions and incubated for 1 day. After the incubation, the WJ-MSCs were treated with human recombinant ghrelin (Phoenix Pharmaneuticals, 031-30) at concentrations of 0, 10 pM, 1 nM, and 100 nM, respectively, under FBS-free conditions. Cells were collected after 6 and 12 hours, respectively. The collected WJ-MSC was treated with Trizol, and mRNA was extracted therefrom. Then, real-time PCR analysis thereof was performed using human AgRP Primer. The sequence information of human AgRP Primer is shown in Table 1. The results of treatment of the cells with human recombinant ghrelin at various concentrations for 6 hours are shown in FIG. 2A. The results of treatment of the cells with human recombinant ghrelin at various concentrations for 12 hours are shown in FIG. 2B.

TABLE 1

|  | Sequence (5'->3') |
| --- | --- |
| AgRP forward (SEQ ID NO: 1) | AGTCACGTGTGGCCCTTCAT |
| AgRP reverse (SEQ ID NO: 2) | TCCGGGATTCTTGCCTAGAG |

Figure 2B:
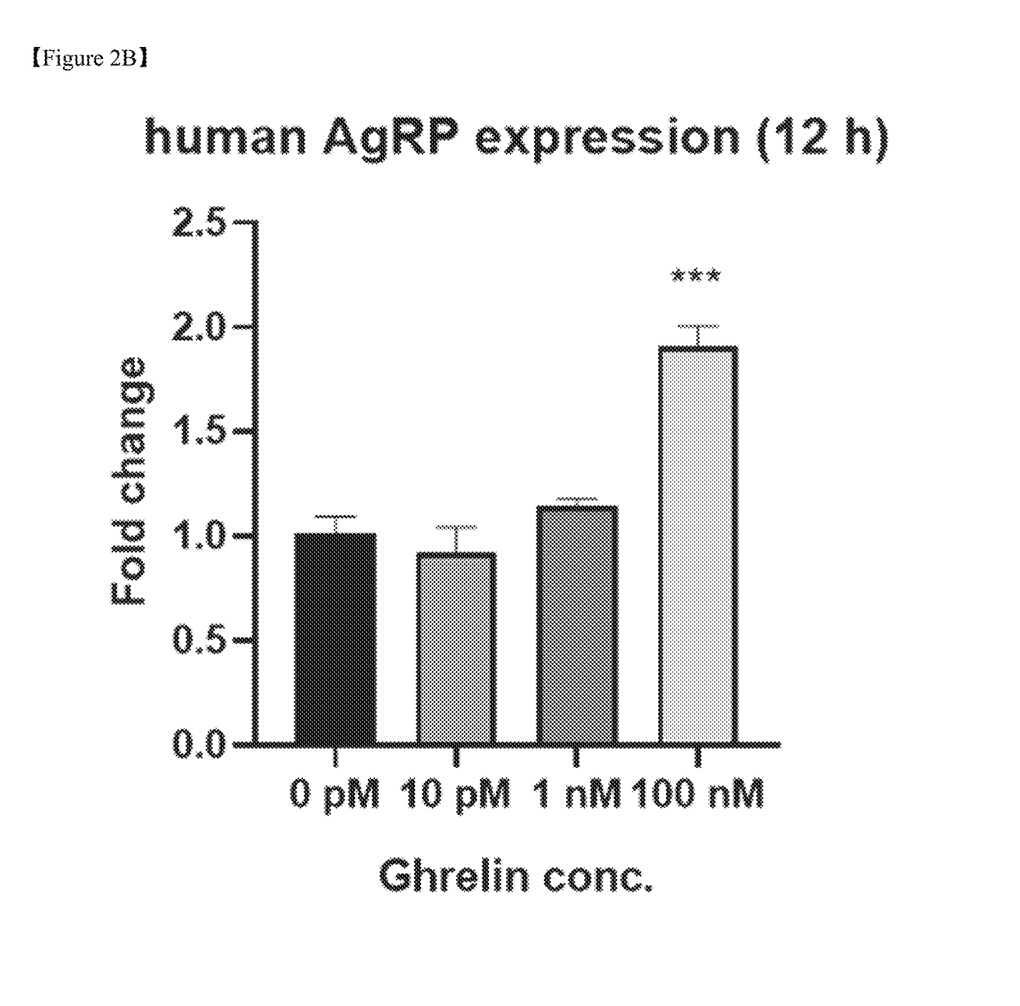
FIG. 2B shows the increase in AgRP gene expression in mesenchymal stem cells (WJ-MSC) treated with human recombinant ghrelin for 12 hours (**$P<0.01$).

As shown in FIG. 2A and FIG. 2B, it was identified that the expression of AgRP gene increased based on the treatment concentration in the WJ-MSC treated with human recombinant ghrelin for 6 hours and 12 hours. In particular, it was identified that the expression of AgRP was significantly increased in the group treated with human recombinant ghrelin at 100 nM concentration. Therefore, it may be identified that mesenchymal stem cells treated with ghrelin may express AgRP as a therapeutic substance for brain neuronal disease at a higher level and thus may be effectively used for the treatment of brain neuronal diseases.

Figure 3A:
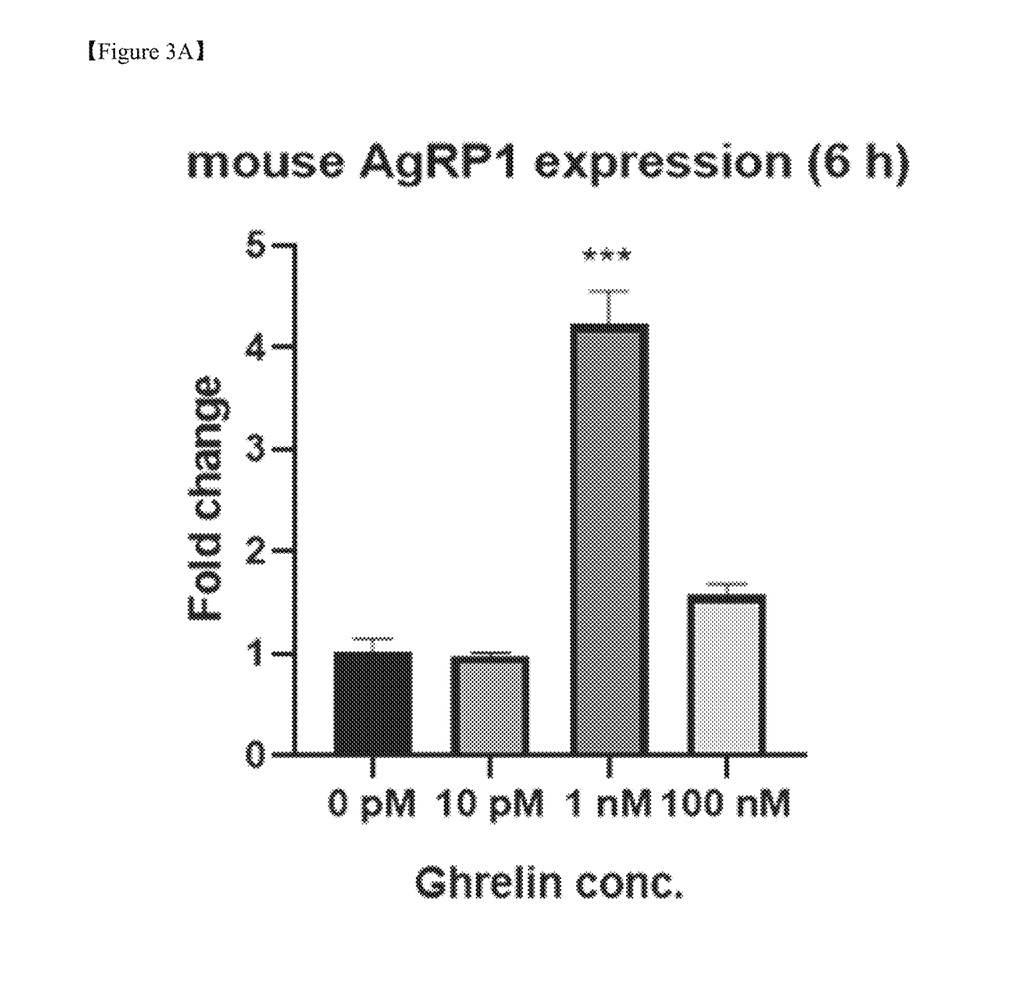
FIG. 3A is a diagram showing the result of identifying the increased expression of AgRP gene in mouse hypothalamus cell line treated with mouse recombinant ghrelin for 6 hours using a pair of mouse AgRP primers (*$P<0.5$, $P<0.01$, * $P<0.001$).
Figure 3B:
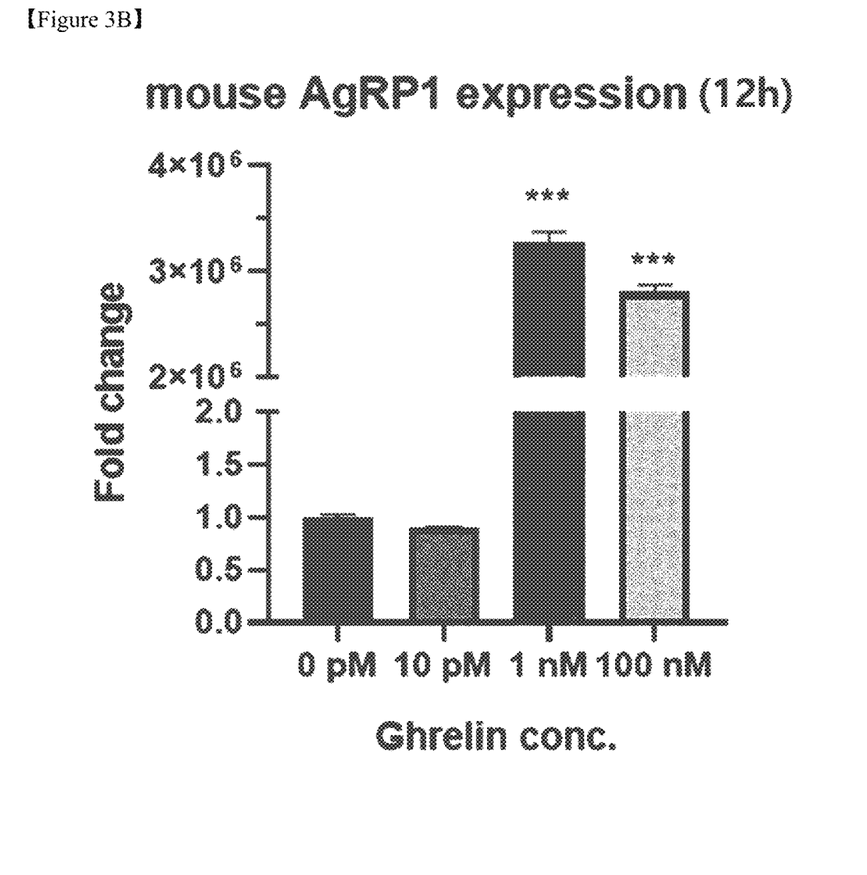
FIG. 3B is a diagram showing the result of identifying the increased expression of AgRP gene in mouse hypothalamus cell line treated with mouse recombinant ghrelin for 12 hours using a pair of mouse AgRP primers (*$P<0.5$, $P<0.01$, * $P<0.001$).
Figure 3C:
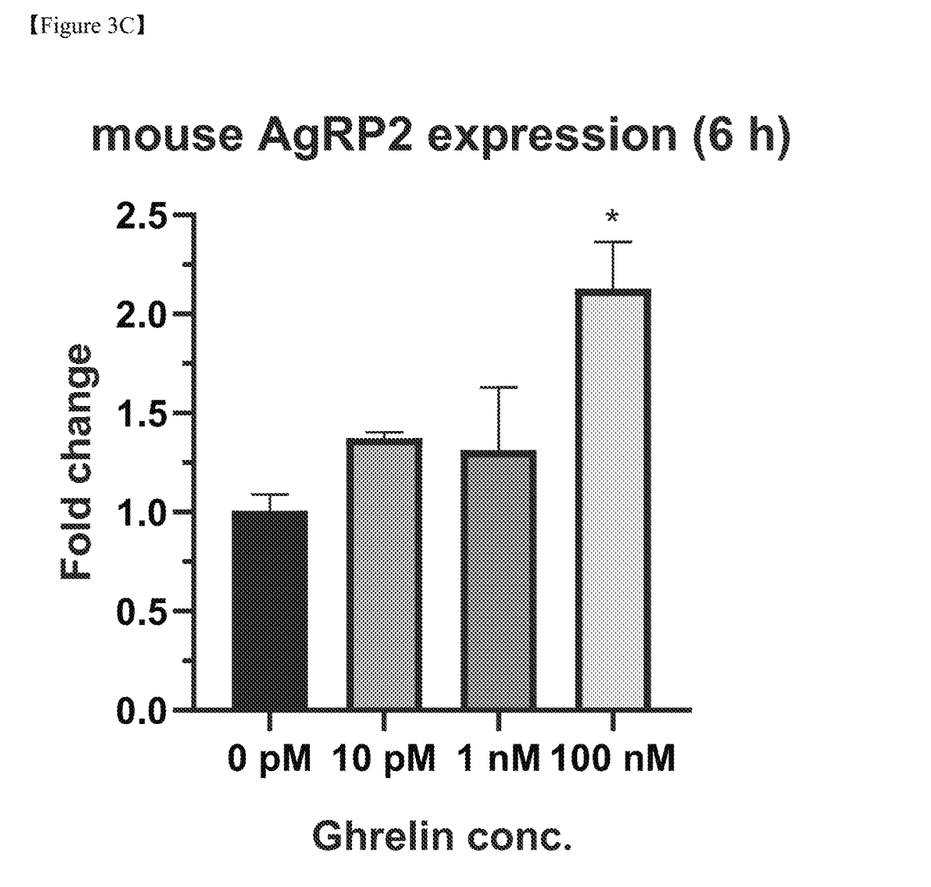
FIG. 3C is a diagram showing the results of identifying the increased expression of AgRP gene in mouse hypothalamus cell line treated with mouse recombinant ghrelin for 6 hours using another pair of mouse AgRP primers (*$P<0.5$, $P<0.01$, * $P<0.001$).
Figure 3D:
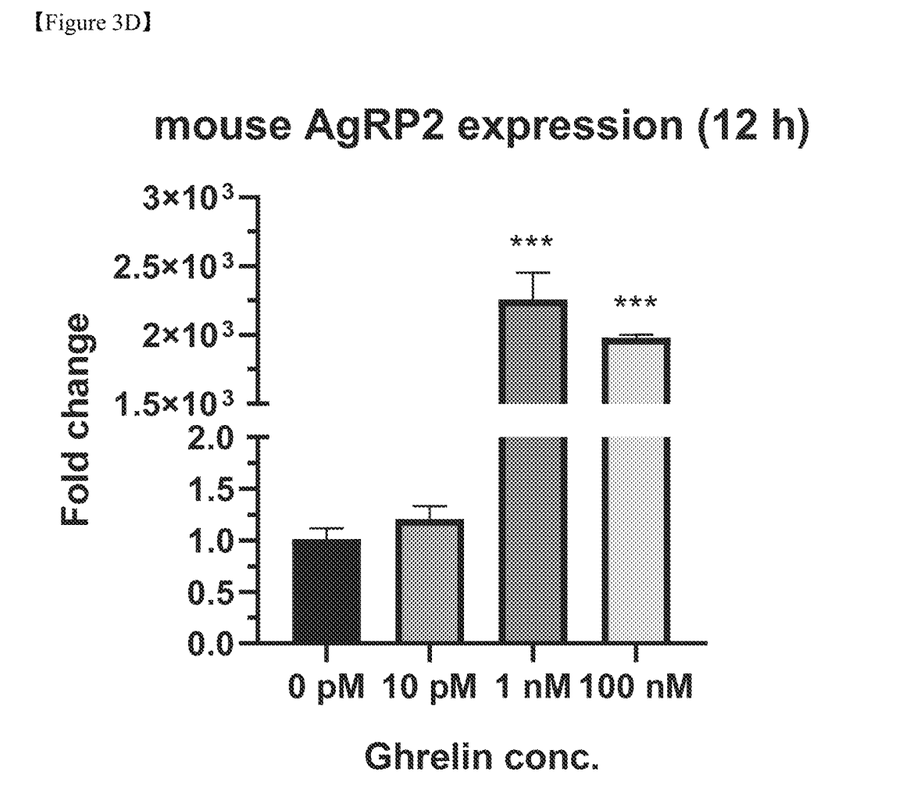
FIG. 3D is a diagram showing the results of identifying the increased expression of AgRP gene in mouse hypothalamus cell line treated with mouse recombinant ghrelin for 12 hours using another pair of mouse AgRP primers (*$P<0.5$, $P<0.01$, *$P<0.001$).

Example 3. Acceleration of AgRP Secretion in Hypothalamic Cells Via Direct Ghrelin Treatment An experiment was conducted to identify the change in AgRP expression level when the mouse hypothalamus cell line was directly treated with the mouse/rat recombinant ghrelin. Specifically, mHYPOE-N46 mouse hypothalamus cell line was thawed in a 175T flask and stabilized for 3 days, and then was incubated for two days in DMEM high glucose medium (Gibco, 11965-092) supplemented with 10% FBS (Biowest, 51480) and penicillin-streptomycin (Gibco, 15140122). Under 10% FBS conditions, the cells are seeded, at $0.8 \times 10^6$, in a 6 well plate and incubated for 1 day. After the incubation, the cells were treated with mouse/rat recombinant ghrelin (Phoenix Pharmaneuticals, 031-31) at concentrations of 0, 10 pM, 1 nM, and 100 nM, respectively, in FBS-free conditions. Cells were collected after 6 and 12 hours, respectively. The collected cells were treated with Trizol. mRNA was extracted therefrom. Then, real-time PCR analysis thereof was performed using two mouse AgRP primer pairs. Table 2 shows the mouse AgRP Primer sequence information. After direct treatment of the cells with ghrelin for 6 or 12 hours, the expression of mAgRP was analyzed. The results of mouse AgRP expression analysis according to ghrelin treatment time using primer mAgRP1 are shown in FIG. 3A and FIG. 3B. In addition, the results of mouse AgRP expression analysis according to ghrelin treatment time using primer mAgRP2 are shown in FIG. 3C and FIG. 3D.

|  | Sequence (5'->3') |
| --- | --- |
| mAgRP1 forward (SEQ ID NO: 3) | AACCTCTGTAGTCGCACCTAGC |
| mAgRP1 reverse (SEQ ID NO: 4) | AAACCGTCCCATCCTTTATTCT |
| mAgRP2 forward (SEQ ID NO: 5) | AAGTCTGAATGGCCTCAAGAAGA |
| mAgRP2 reverse (SEQ ID NO: 6) | GACTCGTGCAGCCTTACACAG |

As shown in FIG. 3A to FIG. 3D, it was identified that the expression of mouse AgRP gene increased according to the concentration of ghrelin in mouse hypothalamus cell line treated with mouse ghrelin. This means that ghrelin may stimulate the pituitary gland to directly mediate the secretion of AgRP. Therefore, it was identified that ghrelin alone could be effectively used for the treatment of brain neuronal diseases.

Example 4. Effect of Treatment of Brain Neuronal Disease Via Combination Treatment of Mesenchymal Stem Cells Treated with Ghrelin or Recombinant Ghrelin Protein and Mesenchymal Stem Cells Treated with Ghrelin An experiment was performed to identify the expression of tau protein when substances of the following groups (i) to (iii) were administered to the ventricles of Alzheimer's disease/frontal temporal dementia transgenic mice.
(i) Mesenchymal stem cell (MSC)
(ii) Mesenchymal stem cell treated with ghrelin (G-MSC)
(iii) Ghrelin and Mesenchymal stem cells treated with ghrelin (Ghrelin+G-MSC)

Specifically, WJ-MSCs were thawed in a 175T flask and stabilized for 3 days, and then cultured for 2 days in MEM alpha medium (Gibco, 12571063) to which 10% FBS (Biowest, S1480) and 5 µg/ml gentamicin were added. Thereafter, $0.8 \times 10^6$ cells were seeded in a T175 flask under 10% FBS conditions, and cultured for 1 day. After incubation, the cells were treated with human recombinant ghrelin (Phoenix Pharmaneuticals, 031-30) at 100 nM concentration under FBS-free conditions. Cells were harvested after 12 hours. The collected WJ-MSC was diluted to a concentration of $1 \times 10^5/7$ µL using phenol-red free MEMa medium.

In the case of combination treatment of mesenchymal stem cells treated with ghrelin and ghrelin (that is, (iii)), human recombinant ghrelin protein was added to the phenol-red free MEMa medium at a concentration of 20 ng/7 µL.

Figure 4A:
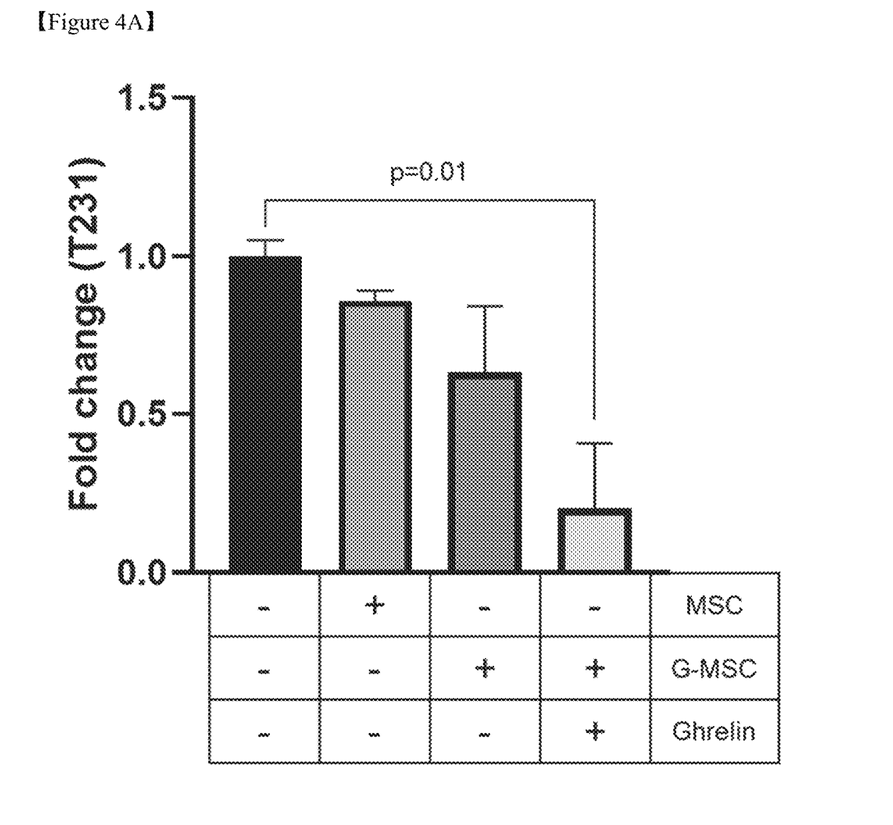
FIG. 4A shows the expression levels of T231 in hippocampus when treating with ghrelin-treated mesenchymal stem cells and treating with a combination of the ghrelin-treated mesenchymal stem cells and ghrelin (MSC; mesenchymal stem cell, G-MSC; ghrelin-treated mesenchymal stem cell, Ghrelin; ghrelin).
Figure 4B:
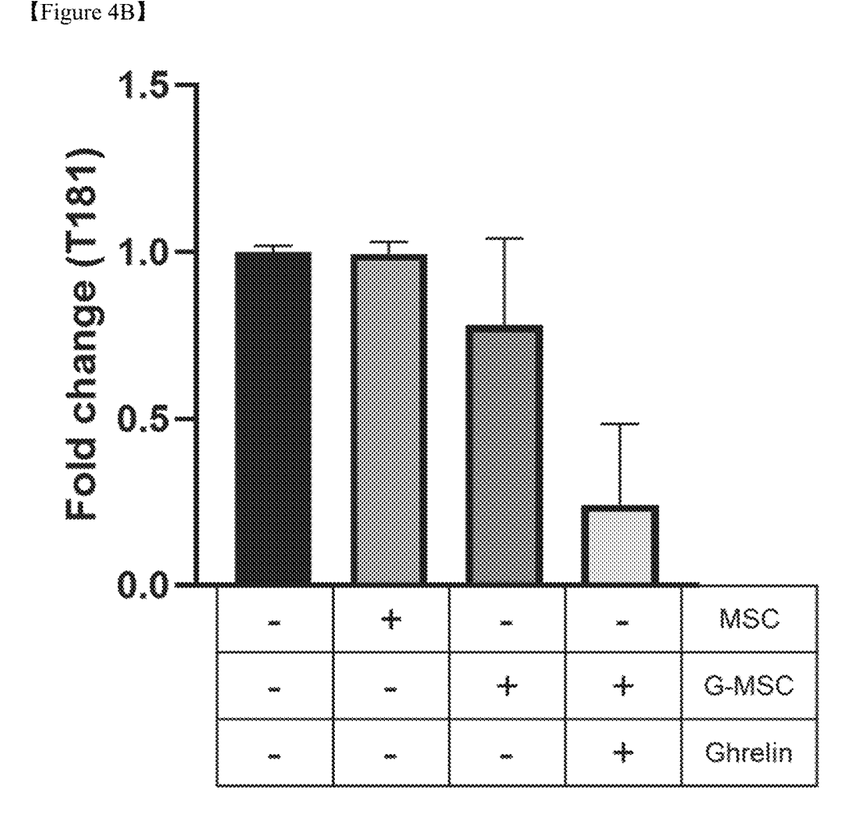
FIG. 4B shows the expression levels of T181 in hippocampus when treating only with ghrelin-treated mesenchymal stem cells and treating with a combination of the ghrelin-treated mesenchymal stem cells and ghrelin (MSC; mesenchymal stem cell, G-MSC; ghrelin-treated mesenchymal stem cell, Ghrelin; ghrelin).
Figure 4C:
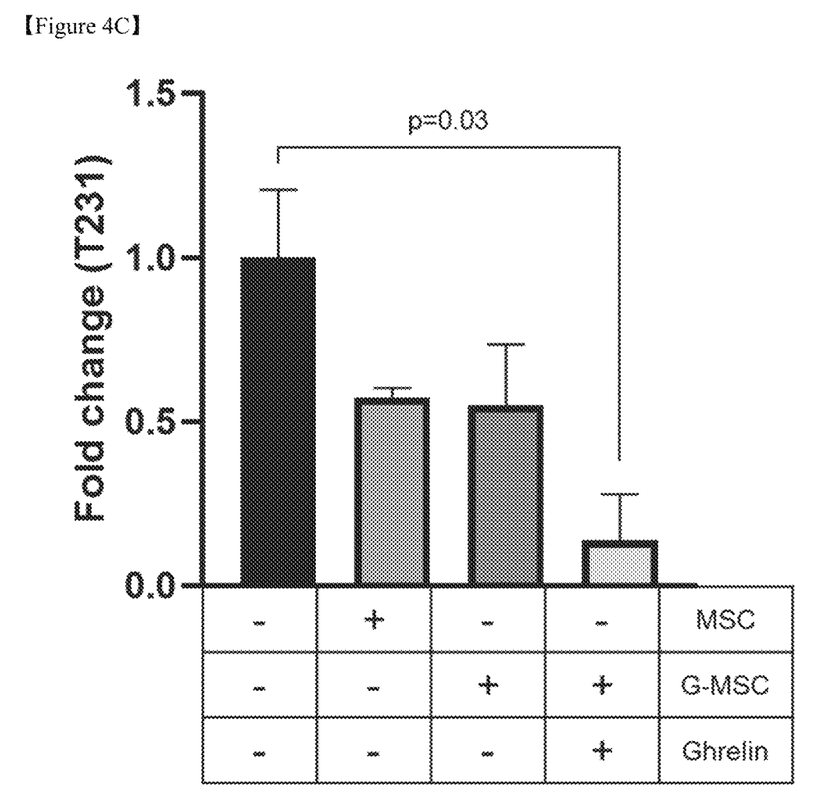
FIG. 4C shows the expression levels of T231 in hypothalamus when treating only with ghrelin-treated mesenchymal stem cells and treating with a combination of the ghrelin-treated mesenchymal stem cells and ghrelin (MSC; mesenchymal stem cell, G-MSC; ghrelin-treated mesenchymal stem cell, Ghrelin; ghrelin).
Figure 4D:
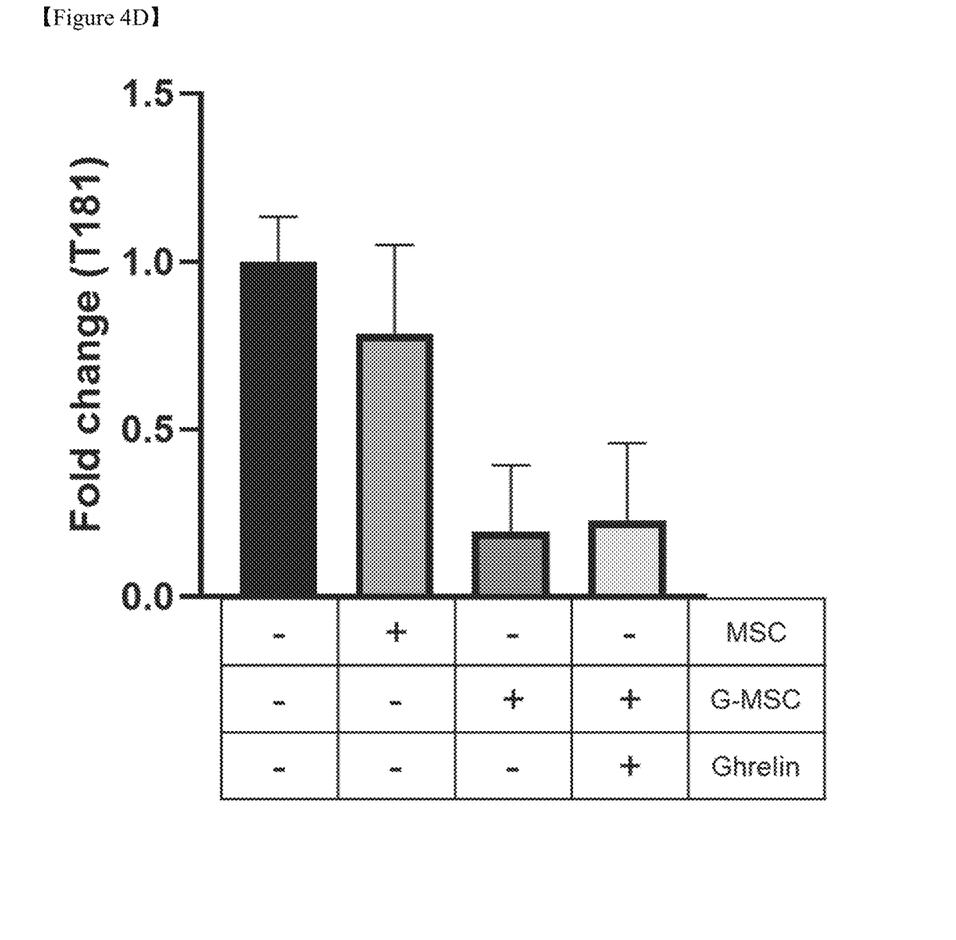
FIG. 4D shows the expression levels of T181 in hypothalamus when treating only with ghrelin-treated mesenchymal stem cells and treating with a combination of the ghrelin-treated mesenchymal stem cells and ghrelin (MSC; mesenchymal stem cell, G-MSC; ghrelin-treated mesenchymal stem cell, Ghrelin; ghrelin).

The (i) to (iii) were administered to the right ventricle (AP −0.4 mm ML+1.0 mm DV-2.4 mm) of eight-month-old Alzheimer's disease/frontal temporal dementia transgenic mouse (B6; C3-Tg (Prnp-MAPT*P301S)PS19Vle/J) at a rate of 1 µl/min. On 2 weeks after the administration of the therapeutic substance, expression levels of hyperphosphorylated tau proteins (T231, T181) in hippocampus and hypothalamus were identified. The results of analyzing the expression levels of T231 and T181 in hippocampus are shown in FIG. 4A and FIG. 4B, respectively. The results of analyzing the expression levels of T231 and T181 in hypothalamus are shown in FIG. 4C and FIG. 4D, respectively.

As shown in FIG. 4A to FIG. 4D, the expression of hyperphosphorylated tau protein was decreased in the group treated with the mesenchymal stem cell (MSC), compared to the control group. The decrease was more pronounced in the mesenchymal stem cell (G-MSC) treated group treated with ghrelin. In addition, it was identified that under the combination treatment of ghrelin and ghrelin-treated mesenchymal stem cells (Ghrelin+ G-MSC), the expression of the hyperphosphorylated tau protein in hippocampus and hypothalamus decreased statistically significantly. This may mean that the mesenchymal stem cells treated with ghrelin are excellent in the treatment of brain neuronal disease, and the combination treatment of the ghrelin-treated mesenchymal stem cells and the ghrelin is very excellent in the treatment effect of brain neuronal diseases.

The ASCII text file "Sequence.txt" created on Dec. 26, 2021, having the size of 2 kilobytes, is incorporated by reference into the specification.

The invention claimed is:

1. A method for producing mesenchymal stem cells for treating brain neuronal diseases, the method comprising treating mesenchymal stem cells with ghrelin at a concentration of 1 nM to 100 nM for 6 to 12 hours, wherein the treatment results in the mesenchymal stem cells having an increased AgRP (Agouti related peptide) expression level compared to mesenchymal stem cells not treated with ghrelin, wherein said mesenchymal stem cells are derived by Wharton's jelly.

2. The method of claim 1, wherein the brain neuronal disease is selected from a group consisting of Alzheimer's disease, frontotemporal dementia, tauopathy, Parkinson's disease, Lou Gehrig disease, Huntington's disease, multiple sclerosis, stroke, thrombosis, embolism, head trauma, cerebral circulatory metabolic disorder, brain dysfunction and dementia.

* * * * *